United States Patent

Fernandes et al.

[11] Patent Number: 5,834,757
[45] Date of Patent: Nov. 10, 1998

[54] DEBITING METHOD FOR INDUCTIVE PREPAYMENT CARDS

[75] Inventors: Rubens Ramos Fernandes; Antonio Massao Nishikawa, both of Campinas SP, Brazil

[73] Assignee: Telecomunicacoes Brasileiras S/A Telebras, Rodovia Campinas, Brazil

[21] Appl. No.: 669,529

[22] PCT Filed: Jan. 23, 1995

[86] PCT No.: PCT/BR95/00004

§ 371 Date: Jul. 11, 1996

§ 102(e) Date: Jul. 11, 1996

[87] PCT Pub. No.: WO95/20203

PCT Pub. Date: Jul. 27, 1995

[30] Foreign Application Priority Data

Jan. 24, 1994 [BR] Brazil ...................................... 9400224

[51] Int. Cl.⁶ .................................................. G06K 19/06
[52] U.S. Cl. .......................................... 235/493; 235/492
[58] Field of Search ...................................... 235/492, 493

[56] References Cited

U.S. PATENT DOCUMENTS 4,029,945  6/1977  Yamada et al. .
5,625,791  4/1997  Rarrugia et al. ......................... 235/492

FOREIGN PATENT DOCUMENTS 7804 885   of 1984   Brazil .
9201380   10/1993   Brazil .
9304503    7/1995   Brazil .
A-0 040 561  11/1981  European Pat. Off. .
A-0 101 344   2/1984  European Pat. Off. .
4-2 463 457   2/1981  France .
2558917       3/1977  Germany .
2650959       2/1978  Germany .

Primary Examiner—Harold Pitts
Attorney, Agent, or Firm—Finnegan, Henderson, Farabow, Garrett & Dunner, L.L.P.

[57] ABSTRACT

An improved debiting method for inductive prepayment cards is provided in which a credit card cell set is divided into sectors for collection purposes, all credits collected from a given sector are collected before the next sector is collected from, the sectors are accessed in a standard order valid for all cards, each sector is made up of a column of cells parallel to a longitudinal axis of the card, and the credit cells are always accessed from the card's internal transverse edge toward the external transverse edge, independently of the orientation in which the card has been inserted in a read/write head.

8 Claims, 4 Drawing Sheets

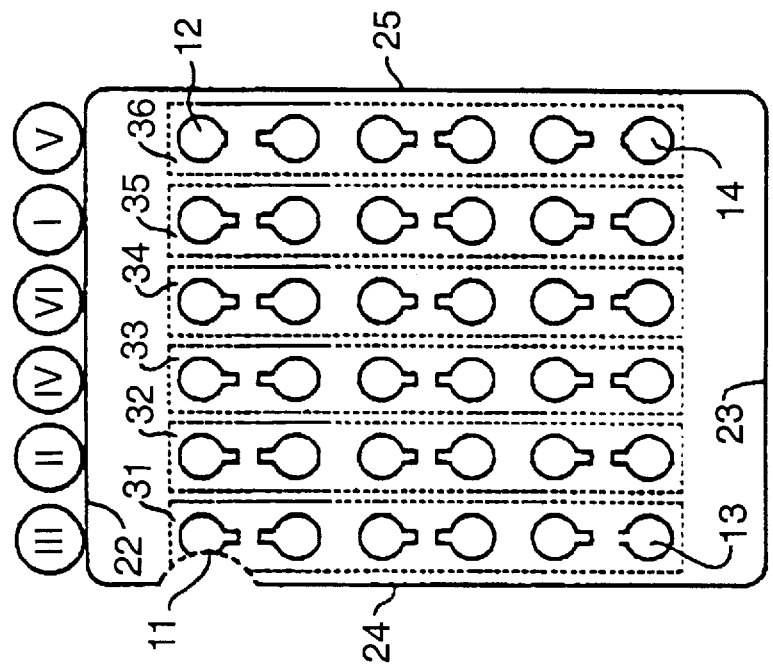
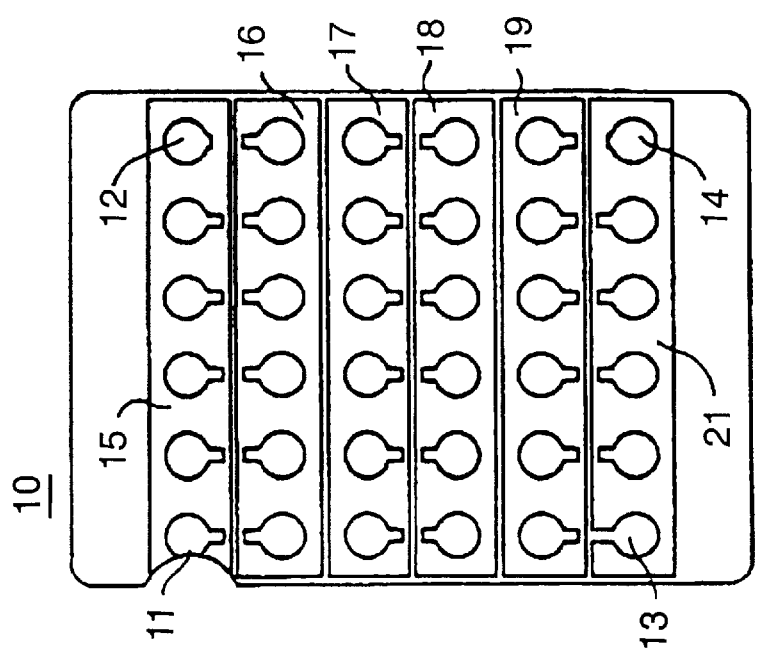

DEBITING METHOD FOR INDUCTIVE PREPAYMENT CARDS

BACKGROUND OF THE INVENTION

I. Field of the Invention

The present invention concerns the debiting of credit information contained on disposable inductive debit cards used as payment elements on public telephone sets as described in patent application BR 9201380. More specifically, it concerns the order in which the credit cells are erased so as to eliminate any fraud attempts.

The invention consists of an improvement of the collection method proposed in application BR 9304503 (International Publication No. WO 96/35188), and is designed to avoid any accidental invalidation of the card through inadvertent misuse during the credit collection operation.

II. Background Information

The method decribed in said document is based on the division of the cards in sectors where all the credit cells of a particular sector are to be burnt out in a pseudo-random fashion before the process begins to burn out cells of another sector. In a preferred embodiement of the invention, the cell and sector burning out order is permanently stored in the memory of the read/write head which processes the card in the following sequence:

on starting up the operation, the red/write device determines in which of the four possible positions the card was inserted;

next the valid and the used up credits are mapped by comparing them with the burn out order stored in the memory of the device;

if the burnt out and the valid cells are in agreement with the order stored in the memory of the device, the card will be accepted as valid; if there are burnt out or valid cells not meeting the stored order, the card will be considered as fraudulent and will be rejected.

The proper working of the method in question supposes that the user does not move the card, after having inserted it, before the end of the transaction. However, unexperienced or unskilled users may withdraw the card as soon as the control circuit of the red/write head has ordered the debiting of a credit; due to the delay between this order and the effective application of the erasing current to the specific sensor coil, the displacement of the card during this time may cause the cell located under said coil to be a different one from the cell which should be burnt out according to the erasure order stored in the device's memory. Consequently, there will be both a burnt out and a valid cell out of order on the card, resulting In the rejection of the card when the user attempts to use it again, since It will be considered as frauded.

SUMMARY OF THE INVENTION

From the foregoing, the present invention alms to provide a credit debiting method which prevents any accidental cell erasure which would invalidate the debit card.

A further aim of the invention is to detect any fraudulent card upon insertion in the read/write head, commanding its immediate rejection.

The above mentioned aims, as well as others, are accomplished by the invention by dividing the card in sectors forming longitudinal columns, having the width of one cell. The first transverse edge is considered to be the one inserted in the read/write device and the second transverse edge the one remaining outside in order to allow the user to handle the card. The erasure of the credit cells proceeds by starting from the valid cell nearest the said first edge and continuing in the direction of said second edge.

According to another characteristic of the invention, an order is set for the debiting of the columns where all cells of a column are to be erased before going on to the next column, said debiting order being stored in the read/write device.

According to another characteristic of the invention, any card bearing more than one column with just one valid credit in it will be considered as frauded.

The previous characteristics, as well as other aspects and advantages of the present invention, will become more evident from the description of an embodiment of it, taken as an example and not in a limiting sense, as shown by the attached drawings in which:

BRIEF DESCRIPTION OF THE DRAWINGS

FIG. 1 shows an inductive debit card having a total of 36 cells, constructed in accordance with the conventional technique.

FIG. 2 shows the card of the previous figure divided into sectors for debeting purposes, every sector comprising a column and further indicating the debiting order of the columns, according to the principles of the present invention.

Figure 3:
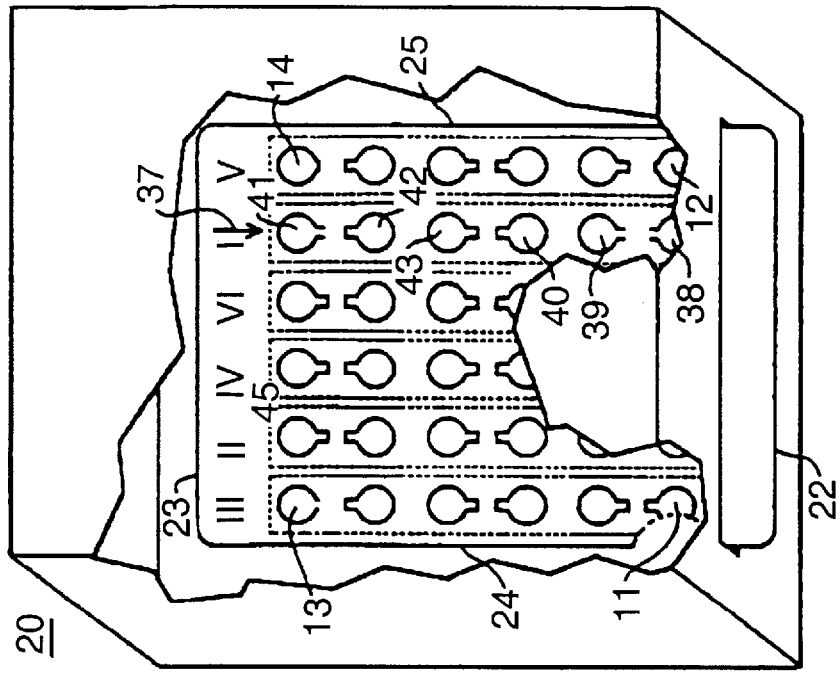
FIG. 3 shows the card of FIG. 2 inserted into the read/write head, showing the erasing direction of the cells of any sector, according to the principles of the present invention.

Reporting now more specifically to FIG. 1, card 10 comprises 6 metallised strips 15 to 21, each one bearing six voided areas in a substatially circular way forming a ring-shaped path for the alternating current induced in the metallic film by sensor coils (not shown) of the read/write device, totalling 36 inductive cells equivalent to one credit each. From this total should be deducted four cells 11, 12, 13 and 14 located at the corners of the cell matrix making up the two identifying sets of card validity and correct insertion into the read/write head (not shown), according to te teachings of patent application BR 9201380.

As shown in FIG. 2, and according to of the present invention, the card is divided into 6 sectors for credit collecting puposes, referenced as 31 . . . 36, every sector comprising one column parallel to the longitudinal axis of the card. Columns 31 and 36, adjacent to longitudinal edges 24 and 25, respectively, contain 4 credit cells each and the remaining ones, 6 credit cells each, totalling said card 32 credits. According to the present invention, the 4 indexing cells will define non ambiguously the position in which the card is being used, as well as the longitudinal edges: "left" edge 24 is adjacent to the column containing two indexing open cells 11 and 13, whereas "right" edge 25 is adjacent to column 36, defined as being the one having two short-circuited indexing cells, 12 and 14, at its ends.

The debiting order of the columns is indicated by the roman notation numbers within the circles, being initially debited the credits contained in column 35, i.e., the second column from edge 25. Next, the credits of columns 32, 31, 33, 36 and 34 will be debited.

The erasure of credit cells within each column depends on the position in which the card is inserted into the read/write device.

FIG. 3 shows the card of FIG. 2 inserted into the read/write device 20 where "open" indexing cells 11 and 13 (not shown) are to the left and short-circuited indexing cells 12 and 14 (shown in a broken line) are to the right so as to define both the first internal transverse edge 22 of the card and the second external transverse edge 23 which remains outside the credit collecting device in order to allow the user to handle the card.

As mentioned before, the order in which the columns (sectors) are debited is shown in Roman notation numbers in FIG. 3. Thus, initially the credits of the second column starting from longitudinal edge 25, in the direction indicated by arrow 37, will be erased. It may be noticed on said figure that the cells of said column, namely cells 38 and 39, have already been erased (interrupted) and cell 40 should be the next one to be erased.

Figure 4:
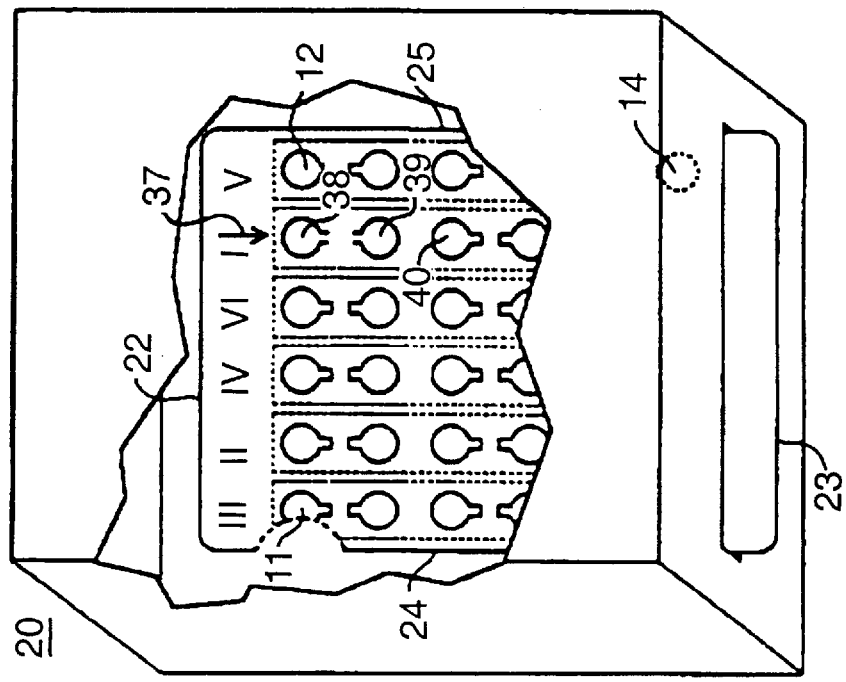
FIG. 4 shows how the erasure of credits is achieved on the card of the previous figure, when inserted in a different position.

FIG. 4 shows what happens when the card, after having debited all the credits of one column, is inserted into the credit collecting device in a different position of the one Illustrated in FIG. 3. In the case shown, the card has been flipped end for end before being reinserted, leaving edge 23 as the internal edge and edge 22 as the external edge, maintaining the relative positions of the left edge 24 and the right edge 25. As shown, the order in which the columns are debited will continue to be maintained, i.e., all credit cells of column "I" will be erased in the direction indicated by arrow 37. As the card has been previously used, cells 38 and 39 have already been erased; therefore, when the card is positioned as shown in FIG. 4, the first cell to be erased will be cell 41, followed, for each credit collected, by cells 42, 43 and eventually cell 40 which will be the last cell of column "I" to be erased.

According to the principles of the present invention, after all the credits contained in column "I" have been used up, the credit collecting device will access the next column "II" where, in this case, the first cell to be erased will be cell 45 and carrying on the action along this column in the same direction as before as indicated by arrow 37. After depleting the credits of column "II" the device addresses column "III", and so on, until all the credits of the card have been used up. As already explained, the change in the card orientation, when inserted in the read/write head each time it is used, does not change the column to be addressed for credit debiting since the four indexing cells, 11 . . . 14, allow the identification of the columns, whichever the position of the card. Moreover, the cells within any column will be addressed following the direction of arrow 37.

Figure 5B:
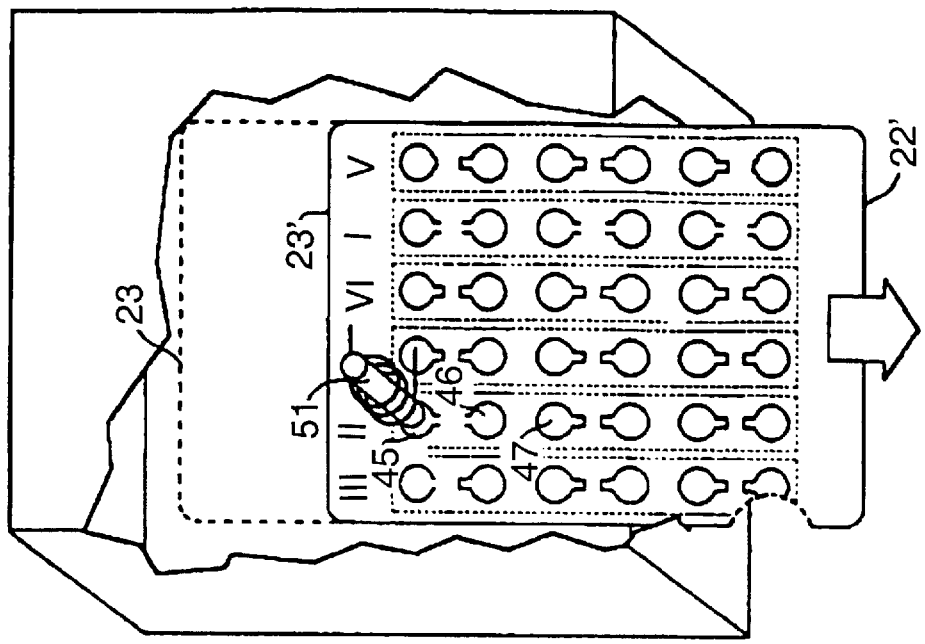
FIGS. 5-*a* and 5-*b* show what happens when the card is moved about during the credit collecting action, according to the principles of the present invention.
Figure 5A:
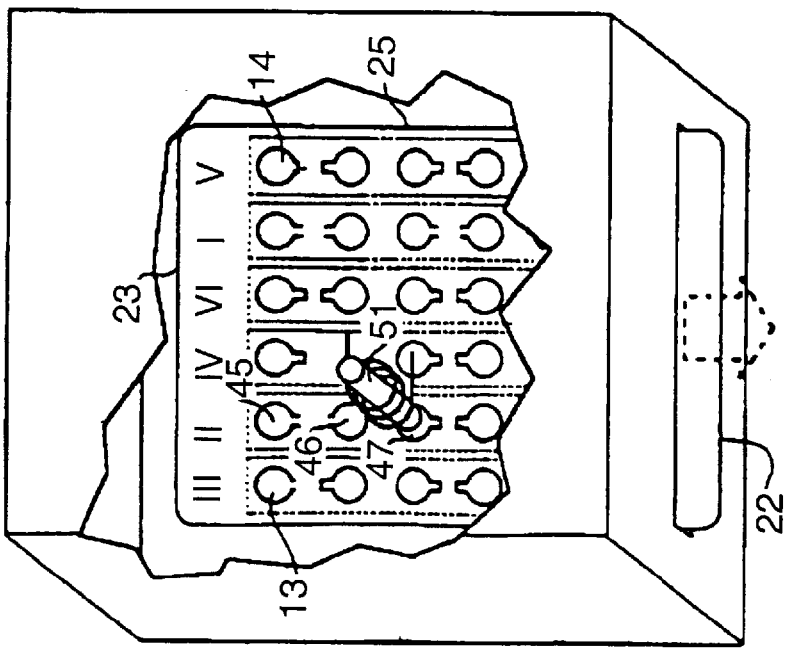

FIGS. 5-a and 5-b show the operation of the system in the case of a card withdrawal or an extemporaneous movement of the card. In 5-a the card is shown as correctly inserted; all credits of column "I" have been erased and the read/write head is ready to start debiting the valid credits of column "II". As may be noticed, the two cells 45, 46 nearest to the Internal edge 23 have already been erased and cell 47, positioned under sensor coil 51, is to be erased next (for reasons of clearness, the remaining sensors are not shown in the figures).

Let us consider now the case in which the user starts to withdraw the card at the beginning of the credit erasure operation by holding it along edge 22, and pulling it in the direction of the dotted arrow. If this withdrawal is quick, the position of the card, at the moment in which the erasing current is actually applied to sensor coil 51, will be as shown in FIG. 5-b. It may be noticed that the card has been moved, changing the internal edge from position 23 to position 23', while original cell 47 is not anymore within the reach of sensor coil 51; in its place is now cell 45 which is already erased. The read/write device will detect the presence of cell 45, i.e., a non collectable credit, and will interrupt the call. However, the user may re-insert the card in the correct position and resume its use since the card continues to be valid for no cells have been erased out of order or out of column "II".

Figure 6:
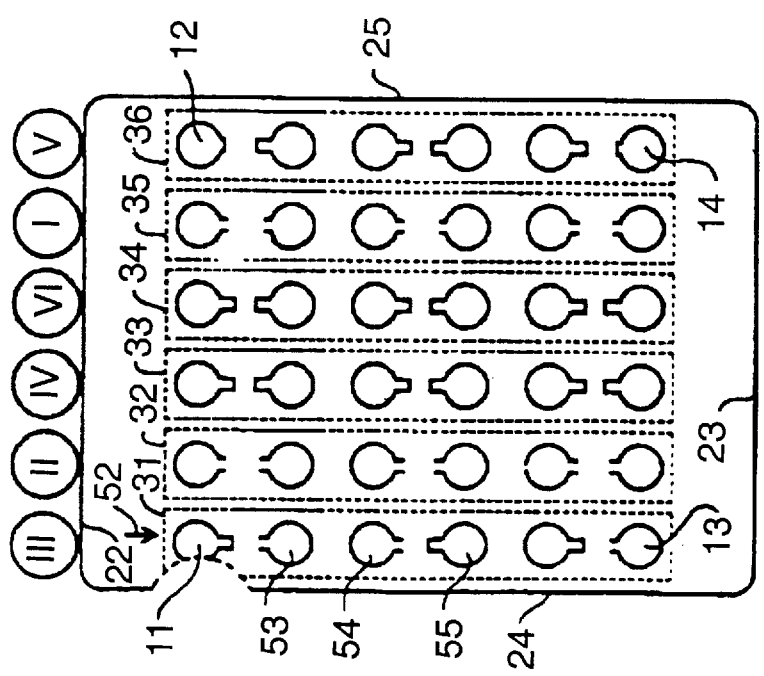
FIG. 6 shows a debit card from which credits contained in more than one column have been erased.

FIG. 6 shows a card in which all credits of two columns (35 and 32) have been used up, having also been used up some credits of column 31, namely, the ones corresponding to cells 53 and 54. Suposing that the card has been inserted correctly in the reqd/write device (not shown) in the position shown in the figure, the direction in which the cells are erased will be the one indicated by arrow 52; thus, the next cell to be burnt will be cell 55.

Figure 7:
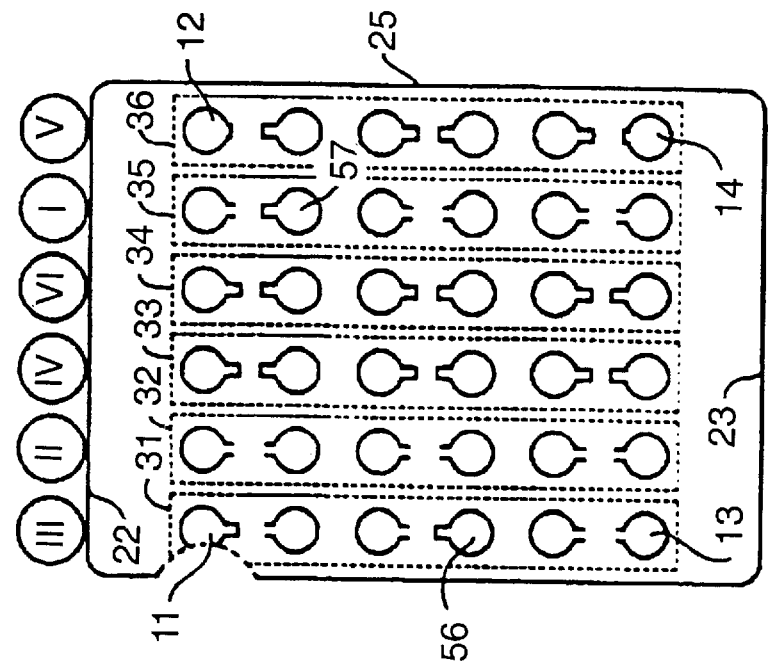
FIG. 7 shows a debit card on which there are more than one columns partially erased.

FIG. 7 shows a card in which a cell has fraudulently been recovered, for instance, cell 57. By inserting such card into the read/write head, the latter will detect the presence of this out of order cell, since, according to the principles of the present invention, the credit erasure can only be started on a given column when all the cells contained in the previous column, according to the preset order, have been used up. Since only part of the credits contained in column 31 of order "III" have been used up, there could not exist any valid cell in any previous column, be it on column 35 (order "I"), or in column 32 (order "II"). Therefore, the presence of the valid cell 57 in column 35 (order "I") indicates a fraudulent recovery of this cell which will bring about the rejection of the card.

Although the invention has been described based on a specific embodiment, it becomes clear that changes may be introduced without overstepping the scope of the inventive concept. Thus, cells may be erased in a different order, for instance, beginning by the first, third and fifth cell and then access the second, fourth and sixth cell. Moreover, the method herein described can be applied to cards having any quantity of credits, without going beyond the limits of the inventive concept.

We claim:

1. Improved debiting method for inductive prepayment cards in which a credit cell set is divided into sectors for collection purposes, all credits collected from a given sector are collected before the next sector is collected from, the sectors are accessed in a standard order valid for all cards, each sector is made up of a column of cells parallel to the longitudinal axis of the card, characterized by the fact that the credit cells are always accessed from the card's internal transverse edge towards the external transverse edge, independently of the orientation in which the card has been inserted in a read/write head.

2. Improved debiting method for inductive prepayment cards, according to claim 1, characterized by the fact that the order in which the card sectors are accessed for credit collecting purposes is stored in the read/write head, said order being based on the positions of said sectors relative to the longitudinal edges of the card, independent of card orientation as to transverse edges.

3. Improved debiting method for inductive prepayment cards, according to claim 2, characterized by the fact that the card's one longitudinal edge is adjacent to the open-circuited indexing cells and the other longitudinal edge is adjacent to the short-circuited indexing cells.

4. Improved debiting method for inductive prepayment cards, according to claim 1, characterized by the fact that the card bearing one or more erased credit cells interspersed with valid credit cells, in any of the sectors, will be considered as frauded.

5. Improved debiting method for inductive prepayment cards in which a credit cell set is divided into sectors for collection purposes, all credits collected from a given sector are collected before the next sector is collected from, the sectors are accessed in a standard order valid for all cards, each sector is made up of a column of cells parallel to the longitudinal axis of the card, characterized by the fact that the credit cells are always accessed from one of the card's transverse edges towards the other of the card's transverse edges, independently of the orientation in which the card has been inserted in a read/write head.

6. Improved debiting method for inductive prepayment cards, according to claim 5, characterized by the fact that the order in which the card sectors are accessed for credit collecting purposes is stored in the read/write head, said order being based on the positions of said sectors relative to the longitudinal edges of the card, independent of card orientation as to transverse edges.

7. Improved debiting method for inductive prepayment cards, according to claim 6, characterized by the fact that the card's one longitudinal edge is adjacent to the open-circuited indexing cells and the other longitudinal edge is adjacent to the short-circuited indexing cells.

8. Improved debiting method for inductive prepayment cards, according to claim 5, characterized by the fact that the card bearing one or more erased credit cells interspersed with valid credit cells, in any of the sectors, will be considered as frauded.

* * * * *